US009304318B2

United States Patent
Sugiyama et al.

(10) Patent No.: US 9,304,318 B2
(45) Date of Patent: Apr. 5, 2016

(54) DISPLAY DEVICE FOR VEHICLE

(71) Applicant: YAZAKI CORPORATION, Tokyo (JP)

(72) Inventors: Tetsuya Sugiyama, Shizuoka (JP);
Kunimitsu Aoki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/195,399

(22) Filed: Mar. 3, 2014

(65) Prior Publication Data

US 2014/0177064 A1 Jun. 26, 2014

Related U.S. Application Data

(63) Continuation of application No. PCT/JP2012/072807, filed on Sep. 6, 2012.

(30) Foreign Application Priority Data

Sep. 6, 2011 (JP) ................. 2011-194256

(51) Int. Cl.
*G02B 27/14* (2006.01)
*G03H 1/00* (2006.01)
(Continued)

(52) U.S. Cl.
CPC ............ *G02B 27/0101* (2013.01); *B60K 35/00* (2013.01); *G02B 27/0018* (2013.01); *G02B 27/0149* (2013.01); *B60K 2350/405* (2013.01); *G02B 2027/0121* (2013.01)

(58) Field of Classification Search
CPC .......... G02B 27/0172; G02B 27/0101; G02B 2027/0178; G02B 2027/0132; G02B 2027/011; G02B 27/01

USPC ................. 359/603–636, 409–410, 462, 466, 359/638–639, 13–14, 404, 407; 348/115; 345/7, 9, 156; 349/11; 340/438, 980, 340/995.1, 815.47, 815.74; 701/1; 310/49 R, 156.32–35, 266–268, 156.02

See application file for complete search history.

(56) References Cited

U.S. PATENT DOCUMENTS 5,886,823 A * 3/1999 Sugano ..................... 359/630
5,905,477 A * 5/1999 Kuwayama et al. .......... 345/7

(Continued)

FOREIGN PATENT DOCUMENTS

| JP | 64-68938 A | 3/1989 |
| JP | 1-68941 U | 5/1989 |

(Continued)

OTHER PUBLICATIONS

International Search Report and Written Opinion of the International Search Report for PCT/JP20121072807 dated Oct. 9, 2012.

(Continued)

*Primary Examiner* — Dawayne A Pinkney
(74) *Attorney, Agent, or Firm* — Kenealy Vaidya LLP

(57) ABSTRACT

A display device for a vehicle includes a deploying and accommodating mechanism configured to change a state of disposition of a combiner between a position of a use state in which a display can be seen in the observation region and a position of an unused state in which a display cannot be seen in the observation region. The deploying and accommodating mechanism includes a restricting unit configured to restrict an inclination, with respect to a prescribed direction, of a surface of the combiner to a predetermined angle of a ghost suppression state at least when the combiner is located at the position of the use state.

13 Claims, 12 Drawing Sheets

(51) Int. Cl.
*H04N 7/00* (2011.01)
*G09G 5/00* (2006.01)
*G02F 1/135* (2006.01)
*G02B 27/01* (2006.01)
*G02B 27/00* (2006.01)
*B60K 35/00* (2006.01)

(56) References Cited

U.S. PATENT DOCUMENTS

| | | | |
|---|---|---|---|
| 6,359,737 | B1 | 3/2002 | Stringfellow |
| 2005/0012682 | A1 | 1/2005 | Jenson et al. |
| 2005/0024490 | A1* | 2/2005 | Harada .............. G02B 27/0149 348/115 |
| 2006/0022896 | A1* | 2/2006 | Kumon et al. ................... 345/7 |
| 2006/0203351 | A1 | 9/2006 | Kageyama et al. |
| 2008/0285138 | A1* | 11/2008 | Lebreton ....................... 359/630 |

FOREIGN PATENT DOCUMENTS

| | | |
|---|---|---|
| JP | H01-68938 A | 5/1989 |
| JP | H09-50227 A | 2/1997 |
| JP | H09-109732 A | 4/1997 |
| JP | H10-278630 A | 10/1998 |
| JP | H11-72742 A | 3/1999 |
| JP | 2006-248323 A | 9/2006 |

OTHER PUBLICATIONS

International Preliminary Report on Patentability for PCT Patent App. No. PCT/JP2012/072807 (Mar. 12, 2014).

Japanese Office Action for the related Japanese Patent Application No. 2011-194256 dated Jul. 7, 2015.

The extended European search report for the related European Patent Application No. 12830549.7 dated Mar. 4, 2015.

* cited by examiner

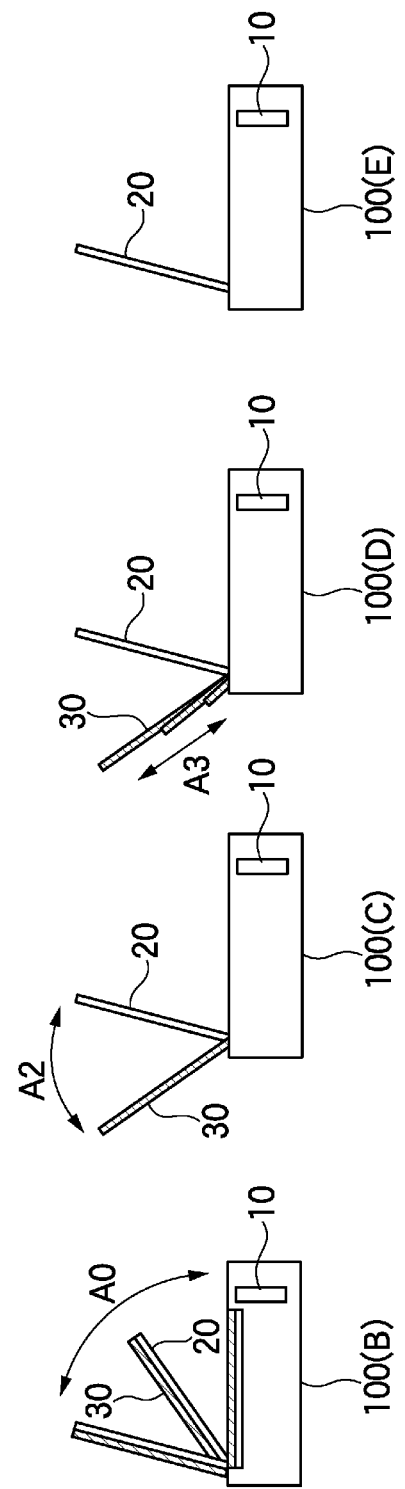

50(A)

50(B)

50(C)

DISPLAY DEVICE FOR VEHICLE

CROSS REFERENCE TO RELATED APPLICATION

This application is a continuation of PCT application No. PCT/JP2012/072807, which was filed on Sep. 6, 2012 based on Japanese Patent Application (No. 2011-194256) filed on Sep. 6, 2011, the contents of which are incorporated herein by reference. Also, all the references cited herein are incorporated as a whole.

BACKGROUND

1. Technical Field

The present invention relates to a display device for a vehicle which displays visible information in the form of a virtual image.

2. Background Art

As for display devices for vehicles, head-up display (HUD) devices which are high in viewability may be used for allowing drivers to quickly recognize, for example, information that is high in urgency though small in information amount.

In general, in vehicular head-up display, an optical image containing visible information displayed on a display unit of a display device main body is projected so as to be guided to the windshield of a vehicle or a light reflection member called a combiner and an image of resulting reflection light is projected so as to be seen by the eyes of the driver.

As a result, when looking ahead in an ordinary driving posture, the driver can visually recognize the visible information projected by the head-up display together with a scene ahead and part of the body of the self vehicle that are seen through the windshield. A virtual image of visible information to be visually recognized by the driver is formed at a position that is distant forward from the surface of the windshield, for example, at a position that is distant from the viewing point by about several meters. Therefore, during driving, the driver can recognize information displayed by the head-up display at the same time as a scene ahead without his or her eyes' having to making focus adjustments.

In general, the device main body of such a head-up display device is disposed inside an instrument panel of the vehicle. And light of visible information that is displayed on the display unit located inside the device main body is projected toward a projection area of the windshield, the combiner, or the like via an optical path including a reflection member such as a mirror of an expansion system, whereby a virtual image is formed at a position that is distant from the viewing point of the driver by a prescribed distance.

Prior art techniques relating to vehicular head-up display devices are disclosed in JP-A-11-72742, JP-UM-A-1-68938, and JP-A-9-109732.

The head-up display disclosed in JP-A-11-72742 has such a structure that a projection combiner is incorporated in the device main body and can be developed and accommodated. That is, when the head-up display is used, the combiner is developed so as to be erected in a prescribed direction so as to be able to project an optical image toward the field of view of the driver. When the head-up display is not used, the combiner can be accommodated so as not to obstruct the view of the driver. Supported by a rotation shaft, the combiner can be developed or accommodated by rotating and displacing it.

As for the head-up display disclosed in JP-UM-A-1-68938, a structure is proposed which allows a combiner to slide in the top-bottom direction (i.e., the direction perpendicular to the thickness direction). This structure allows the combiner to move to such a position that the head-up display is usable and to escape to a position where it does not obstruct the view of the driver.

JP-A-9-109732 discloses a structure which allows a combiner (transparent reflection plate) capable of being used in a head-up display to be displaced into an erected use state or an inclined accommodated state.

Incidentally, in vehicles such as automobiles, when the intensity of external light such as sunlight is high, strong light passes through the windshield and shines on the instrument panel. Furthermore, light reflected from the surface of the instrument panel may be reflected by the surface of the windshield and projected toward the field of view of the driver.

As a result, not only a scene ahead such as a road but also a superfluous virtual image (ghost) produced by reflection from the surface of the instrument panel exists in the field of view of the driver and may obstruct driving (e.g., dazzle the driver). In view of this, in many cases, the surface of the instrument panel is treated properly so as to less likely produce a ghost.

On the other hand, in vehicles equipped with a head-up display, a ghost may occur due to the presence of a combiner (described above). That is, external light such as sunlight passes through the windshield and shines on the head-up display that is disposed in the vicinity of the surface of the instrument panel. And reflection light from the surface of the instrument panel is reflected by the surface of the windshield and projected toward the field of view of the driver. As a result, a virtual image (ghost) of part of the head-up display goes into the eyes of the driver and obstructs driving.

There are no prior art techniques in which particular countermeasures are taken against a superfluous ghost that is produced by a head-up display. In particular, combiners that are configured so as to be movable are currently in such a situation that even if a certain countermeasure is taken, formation of a superfluous ghost due to reflection of external light by a member of the combiner cannot be avoided when the combiner is in a certain state (in terms of position, inclination, or the like).

The present invention has been made in the above circumstances, and an object of the invention is therefore to provide a display device for a vehicle which can suppress formation of a superfluous ghost due to reflection of external light even in the case where a combiner is used that is configured so as to be movable.

To attain the above object, the display device for a vehicle according to the invention has features that are expressed as the following items (1)-(9):

(1) A display device for a vehicle which has a display unit for displaying visible information and which reflects with a combiner and projects, toward a prescribed observation region, light carrying visible information to be displayed on the display unit to display the visible information in a form of a virtual image, the display device comprising:

a deploying and accommodating mechanism configured to change a state of disposition of the combiner between a position of a use state in which a display can be seen in the observation region and a position of an unused state in which a display cannot be seen in the observation region, wherein the deploying and accommodating mechanism includes a restricting unit configured to restrict an inclination, with respect to a prescribed direction, of a surface of the combiner to a predetermined angle of a ghost suppression state at least when the combiner is located at the position of the use state.

(2) The display device for the vehicle according to item (1), wherein the deploying and accommodating mechanism includes a slide mechanism which can move the combiner parallel with the surface of the combiner in a vertical direction while the inclination of the surface of the combiner is kept at the angle of the ghost suppression state.

(3) The display device for the vehicle according to item (1), wherein the deploying and accommodating mechanism includes an angle adjusting mechanism configured to adjust the inclination of the surface of the combiner between the angle of the ghost suppression state and an angle of an escape state in which the surface of the combiner is approximately located in a horizontal direction.

(4) The display device for the vehicle according to item (3), further comprising:

a light reflection suppressing cover capable of covering a surface, opposite to a projection surface, of the combiner; and a cover escape mechanism capable of causing the light reflection suppressing cover to escape to a position that is distant from the combiner at least when the combiner is located in the angle of the ghost suppression state.

(5) The display device for the vehicle according to item (4), wherein the deploying and accommodating mechanism includes a first drive unit configured to adjust the inclination of the surface of the combiner and a second drive unit configured to adjust at least the inclination of the light reflection suppressing cover.

(6) The display device for the vehicle according to item (5), wherein the second drive unit includes, as guide grooves for restricting movement of the light reflection suppressing cover, a rotation groove which is engaged with a first portion of the light reflection suppressing cover and guides the light reflection suppressing cover in its rotation direction and a pull-in groove which communicates with the rotation groove, is engaged with a second portion of the light reflection suppressing cover, and guides the light reflection suppressing cover in a direction that is parallel with its surface.

(7) The display device for the vehicle according to item (4), wherein the deploying and accommodating mechanism includes a first drive unit configured to adjust the inclination of the surface of the combiner and a second drive unit configured to adjust the position of the light reflection suppressing cover between a position for covering the combiner and a position of escape from the combiner;

wherein the light reflection suppressing cover is deformable; and wherein the second drive unit has a wind-up mechanism which is connected to a bottom end of the light reflection suppressing cover.

(8) The display device for the vehicle according to item (7), wherein side end portions of the combiner are formed with guide grooves for restricting a movement range of the light reflection suppressing cover so that the light reflection suppressing cover can move only parallel with the surface of the combiner.

(9) The display device for the vehicle according to any one of items (1) to (8), further comprising:

an optical path bending mirror which is disposed on an optical path between the display unit and the combiner.

According to the display device for a vehicle having the configuration of item (1), the inclination of the surface of the combiner is restricted in the use state. Therefore, a phenomenon that external light produced by the combiner itself or its vicinity goes toward the viewing point of the driver can be suppressed, whereby formation of a superfluous ghost can be prevented.

According to the display device for a vehicle having the configuration of item (2), the inclination of the surface of the combiner can be kept at the restriction angle even when or after the combiner is accommodated, as a result of which formation of a superfluous ghost can always be prevented.

According to the display device for a vehicle having the configuration of item (3), the space that is necessary for housing the combiner can be reduced, whereby the capacity of the display device itself for a vehicle and the space in the vehicle that is necessary for its installation can be reduced.

According to the display device for a vehicle having the configuration of item (4), the light reflection suppressing cover suppresses reflection of external light when the combiner is accommodated. Therefore, formation of a superfluous ghost can always be prevented. Furthermore, when the combiner is used, the light reflection suppressing cover escapes to expose the back side of the combiner. As a result, the driver can see, for example, a scene ahead (i.e., on the back side of the combiner) that is carried by light passing through the combiner.

According to the display device for a vehicle having the configuration of item (5), the inclination of the surface of the combiner and the inclination of the light reflection suppressing cover can be adjusted by the respective drive units which are independent of each other. Therefore, the inclinations can easily be adjusted to proper angles.

According to the display device for a vehicle having the configuration of item (6), the inclination of the light reflection suppressing cover and its advance/retreat position in the direction parallel with its surface can be adjusted by a simple control. Furthermore, the space that needs to be secured for escape of the light reflection suppressing cover can be reduced, whereby the capacity of the display device itself for a vehicle and the space in the vehicle that is necessary for its installation can be reduced.

According to the display device for a vehicle having the configuration of item (7), the light reflection suppressing cover can easily be moved to the position of the state in which to cover the opposite side of the combiner and the position of the escape state. Furthermore, the space that needs to be secured for escape of the light reflection suppressing cover can be reduced, whereby the capacity of the display device itself for a vehicle and the space in the vehicle that is necessary for its installation can be reduced.

According to the display device for a vehicle having the configuration of item (8), the light reflection suppressing cover can be prevented from being deformed and thereby lifting up from the surface of the combiner. Therefore, reflection of light from the back surface of the combiner can be suppressed and hence formation of a superfluous ghost can be prevented.

According to the display device for a vehicle having the configuration of item (9), the optical path from the display unit to the combiner can be elongated without increasing the size of the device body. As a result, the distance from the viewing point of the driver to the position of a displayed virtual image can be made long without increasing the magnification of the optical system.

The invention makes it possible to suppress formation of a superfluous ghost due to reflection of external light even in the case where a combiner is used that is configured so as to be movable. That is, even where a head-up display is used, the invention can make formation of a driving-obstructing superfluous image less likely and thus serves for safe driving.

The invention has been described above in a simplified manner. The details of the invention will become more apparent when the modes for carrying out the invention which will be described below are read with reference to the accompanying drawings.

BRIEF DESCRIPTION OF THE DRAWINGS

FIGS. 9A-9D are vertical sectional views showing a modification of the form change of the display device for a vehicle shown in FIGS. 6A and 6B.

DETAILED DESCRIPTION OF THE EXEMPLARY EMBODIMENTS

A display device for a vehicle according to a specific embodiment of the present invention will be hereinafter described with reference to the drawings.

<Basic Configuration and Operation>

Figure 1:
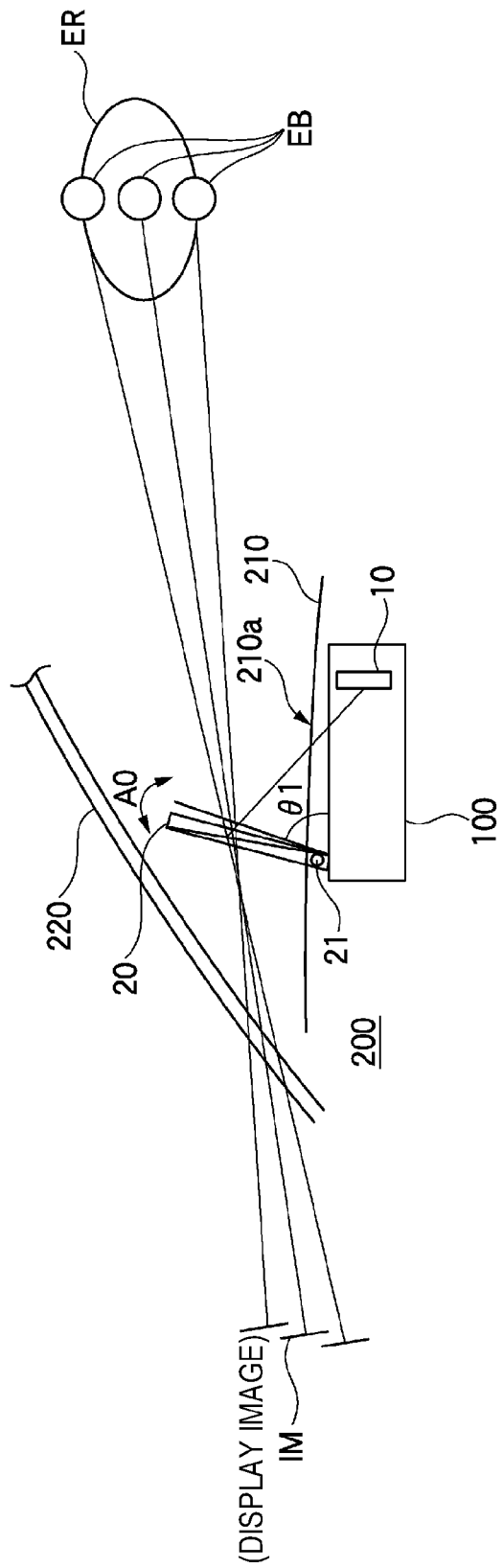
FIG. 1 is a vertical sectional view as seen from one side of a vehicle showing a basic configuration and an optical path including display elements of the display device for a vehicle according to the embodiment.

FIG. 1 is a vertical sectional view as seen from one side of a vehicle showing a basic configuration and an optical path including display elements of the display device for a vehicle according to the embodiment.

A HUD (head-up display) unit 100 shown in FIG. 1 corresponds to the display device for a vehicle according to the invention. In the example shown in FIG. 1, the HUD unit 100 is disposed inside (under) an instrument panel 210 of a vehicle 200. The instrument panel 210 is formed with an opening 210a adjacent to the optical path of the HUD unit 100.

A display device 10 for generating information of a display subject is provided inside the HUD unit 100. The display device 10 is, for example, a transmission liquid crystal display panel and can display visible information such as numerical values, characters, figures, etc. when necessary. Equipped with an illumination light source such as a backlight, the display device 10 can emit, in the form of an optical image, visible information displayed thereon.

The HUD unit 100 is equipped with a combiner 20. That is, an optical image emitted from the display device 10 is reflected by the surface of the combiner 20 and projected toward an eye box EB which corresponds to the position of a viewing point of the driver so that the image displayed by the display device 10 can be visually recognized in the range of the eye box EB.

Restricting the range where displayed information can be recognized visually to the eye box EB is to miniaturize the HUD unit 100. However, the position of the actual viewing point varies depending on the body shape and the posture of the driver. In view of this, the HUD unit 100 is configured so that the eye box EB can be moved in a relatively wide eye range ER. More specifically, an inclination θ1 can be adjusted finely by rotating the combiner 20 about a rotation shaft 21, that is, moving it in the direction indicated by arrow A0, whereby the optical path can be corrected and the eye box EB can be moved in the eye range ER. In the example of FIG. 1, the angle θ1 represents the angle of the reflection surface of the combiner 20 with respect to the horizontal surface.

At the position of the eye box EB, an image is recognized visually as if to exist, for example, at the position of a display image IM shown in FIG. 1. That is, when viewed from the position of the eye box EB, the image is displayed as a virtual image that looks as if to exist ahead of the combiner 20.

The combiner 20 is like a thin plate and is made of a material capable of transmitting light in its thickness direction like a half mirror. Therefore, the driver can visually recognize, at the same time, a scene ahead that is carried by light actually passing through the combiner 20 and a display image (virtual image) that is carried by light reflected by the combiner 20.

In practice, the HUD unit 100 is configured so that the distance from the position of the eye box EB to the displayed virtual image IM is longer than or equal to 2 m. To secure a display distance 2 m in a small HUD unit 100, it is conceivable to adjust the focal length by making the reflection surface of the combiner 20 a concave surface. To prevent a displayed image from being distorted, it is also conceivable to make the concave surface of the combiner 20 an aspherical surface.

<Description of Ghost Formation>

Figure 2:
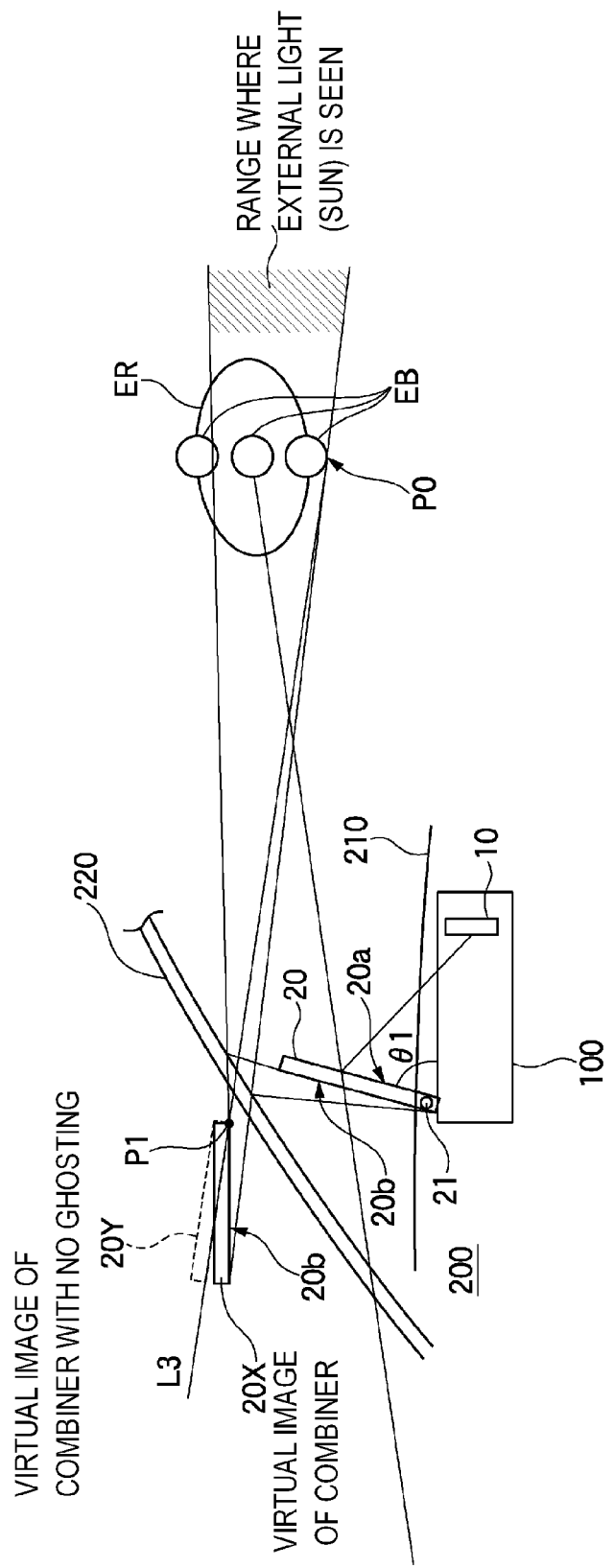
FIG. 2 is a vertical sectional view showing how external light comes to be involved in the display device for a vehicle shown in FIG. 1.

FIG. 2 shows how external light comes to be involved in the display device for a vehicle shown in FIG. 1. The example of FIG. 2 assumes a case that external light is seen from inside the vehicle 200.

In the state shown in FIG. 2, external light that is reflected by the back surface 20b of the combiner 20 goes upward, and part of it is reflected by the surface of the windshield 220 and goes toward the eye range ER.

Thus, the reflection light of the external light shines on the eyes of the driver. That is, the eyes see an optical image formed by the reflection light coming from the back surface 20b of the combiner 20 (i.e., an image reflected from the surface of the windshield 220). Therefore, the driver sees a virtual image 20X of the combiner having the same pattern as is seen when the combiner 20 is looked down from side of the windshield 220, as a ghost as if it were formed on the windshield 220. Actually, the position where the virtual image 20X of the combiner should exist appears bright and the driver may be dazzled by this bright light and thereby rendered in danger.

<Means for Preventing Ghost Formation Due to External Light>

In the state shown in FIG. 2, the driver sees a virtual image if it is located below a line segment L3 which connects a point P0 which is the lower end of the observation range of the driver and a point P1 which is one end of a virtual image of the combiner 20. That is, the driver can see that part of the virtual image 20X of the combiner which is located below the line segment L3. On the other hand, the driver cannot see a virtual image 20Y of the combiner shown in FIG. 2 because it is located above the line segment L3.

Therefore, if a virtual image of the combiner 20 that is formed actually due to external light is moved to the position of the virtual image 20Y of the combiner, it is possible to establish a state that a ghost does not influence the driver. A virtual image that is formed actually can be moved to the position of the virtual image 20Y of the combiner by restricting, in advance, the angle θ1 of the surface 20b of the combiner 20 so that it becomes larger than or equal to a prescribed angle.

<Development/Housing (1) of Combiner>

Figure 3A:
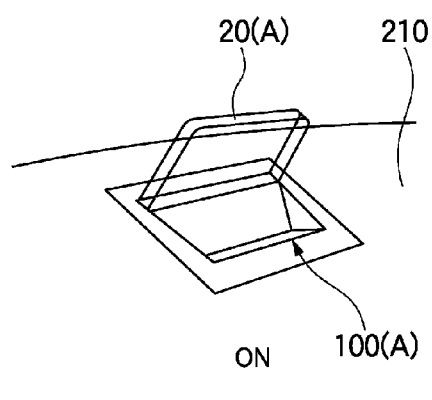
FIGS. 3A and 3B show example appearances of the display device for a vehicle shown in FIG. 1 in a use state and a accommodated state, respectively.
Figure 3B:
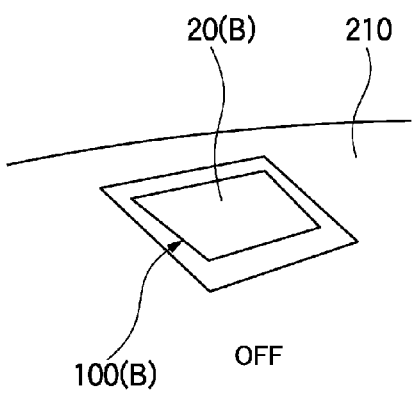
Figure 4:
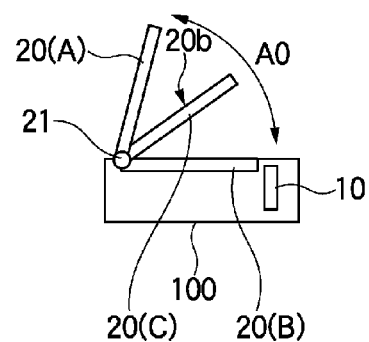
FIG. 4 is a vertical sectional view of the display device for a vehicle shown in FIG. 1 showing how it is changed in form between the use state and the accommodated state.

FIGS. 3A and 3B show example appearances of the display device for a vehicle shown in FIG. 1 in a use state and a accommodated state, respectively. FIG. 4 is a vertical sectional view of the display device for a vehicle showing how it is changed in form between the use state and the accommodated state.

When the driver does not use a display on the HUD unit 100, the combiner 20 existing in the field of view ahead may obstruct the view of the driver. It is therefore desirable to remove the combiner 20 from the field of view of the driver when the HUD unit 100 is not used.

That is, when the driver requires a display on the HUD unit 100, the combiner 20 is developed (state 20(A)) so as to be viewable as shown in FIG. 3A (state 100(A)). When the driver does not use a display on the HUD unit 100, the combiner 20 is accommodated (state 20(B)) so as not to be seen by the driver as shown in FIG. 3B (state 100(B)).

More specifically, as shown in FIG. 4, the combiner 20 can be displaced into states 20(A), 20(B), and 20(C) by rotating it about the rotation shaft 21 which is included in a deploying and accommodating mechanism. That is, the HUD unit 100 is positioned into the state 20(A) when a display on the HUD unit 100 is used, and is accommodated via the state 20(C) when a display on the HUD unit 100 is not used.

However, at least when a display on the HUD unit 100 is used, to prevent occurrence of a ghost (described above), the position of a virtual image of the combiner 20 formed due to external light needs to be restricted to the position of the virtual image 20Y of the combiner shown in FIG. 2. Therefore, when the combiner 20 is in the developed state (state 20(A)) shown in FIG. 4, its inclination is restricted so as to be larger than or equal to a prescribed angle like the inclination θ1 shown in FIG. 2. For example, a proper stopper member (restricting means) is provided in the moving mechanism (deploying and accommodating mechanism) for the combiner 20 so that the movement of the combiner 20 is stopped at a development position corresponding to a restriction angle. Alternatively, the restricting means for the combiner 20 may be implemented by, for example, an electric control using a motor or the like that is performed in accordance with a position detected by a sensor.

<Development/Housing (2) of Combiner>

Figure 5:
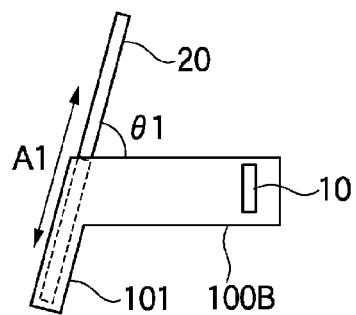
FIG. 5 is a vertical sectional view showing an example structure for moving a combiner to a use state position and a accommodated state position.

FIG. 5 shows an example structure (a modification of the structure shown in FIG. 4) for moving the combiner 20 to the use state position and the accommodated state position.

A HUD unit 100B shown in FIG. 5 is equipped with a deploying and accommodating mechanism 101 which supports the combiner 20 so that it can move straightly (roughly vertically) in the direction indicated by arrow A1. When a display on the HUD unit 100B is used, the combiner 20 can be positioned at the position indicated by a solid line in FIG. 5. Therefore, as in the case of the above-described HUD unit 100, the inclination θ1 of the combiner 20 can be kept at the restriction angle.

When a display on the HUD unit 100B is not used, the combiner 20 can escape to the position indicated by a broken line through a downward movement in the direction by arrow A1. That is, the combiner 20 can be accommodated so as to be removed from the field of view of the driver.

In the structure shown in FIG. 5, the inclination θ1 of the combiner 20 can always be kept constant irrespective of whether the combiner 20 is developed, accommodated, or being moved. Therefore, it is possible to eliminate influence of a ghost that is formed due to external light not only when a display on the HUD unit 100B is used but also when the combiner 20 is being moved. That is, the deploying and accommodating mechanism 101 is equipped with the support member (restricting means) which keeps the angle of the combiner 20 constant.

In the HUD unit 100B shown in FIG. 5, a space for accommodating the combiner 20 needs to be secured at the escape position indicated by the broken line. That is, the size of the device is somewhat increased because in the deploying and accommodating mechanism 101 the body of the HUD unit 100B needs to be provided with a special housing space that extends downward and a member for guiding the combiner 20 in the direction indicated by arrow A1 needs to be disposed. Furthermore, a large installation space for the HUD unit 100B is required on the vehicle side.

<Countermeasure (1) Against Ghost in Unused State>

In the case of the HUD unit 100 which is equipped with the movably configured combiner 20 shown in FIG. 4, the inclination θ1 of the combiner 20 cannot be kept at the above-described restriction angle when it is in the moving state (state 20(C)) or the accommodated state (state 20(B)). That is, a ghost that is formed by reflection of external light by the surface 20b may influence the driver when the combiner 20 is in the accommodated or is changed in form to develop or house it. A countermeasure against such a ghost will be described below.

Figure 6A:
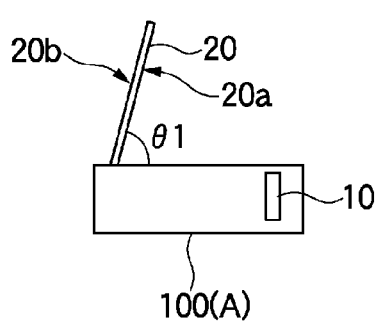
FIGS. 6A and 6B are vertical sectional views showing how a display device for a vehicle having a movable cover is changed in form.
Figure 6B:
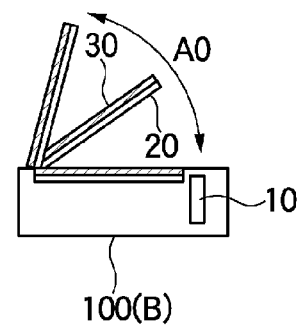
Figure 7A:
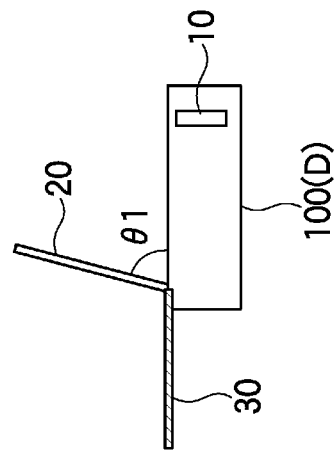
FIGS. 7A-7C are vertical sectional views showing, in a specific manner, how the display device for a vehicle shown in FIGS. 6A and 6B is changed in form.
Figure 7B:
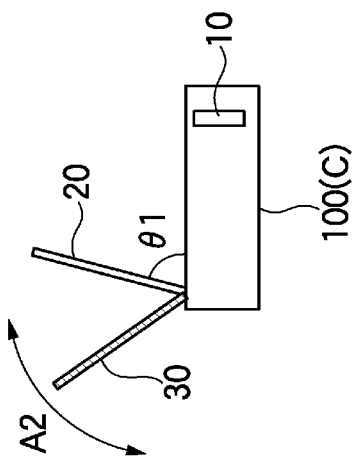
Figure 7C:
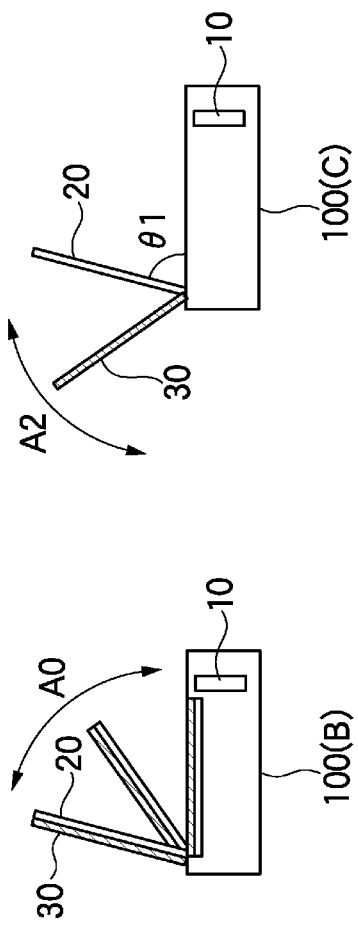
Figure 8:
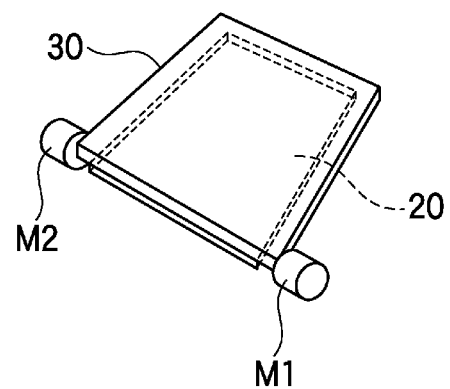
FIG. 8 is a perspective view showing an example configuration of a drive mechanism which enables the form change shown in FIGS. 7A-7C.

FIGS. 6A and 6B show how a display device for a vehicle having a movable cover is changed in form. FIGS. 7A-7C show, in a specific manner, how the display device for a vehicle shown in FIGS. 6A and 6B is changed in form. FIG. 8 shows an example configuration of a drive mechanism which enables the form change shown in FIGS. 7A-7C.

In the HUD unit 100 in the use state (100(A)) shown in FIG. 6A, ordinary HUD display is possible because both surfaces 20a and 20b of the combiner 20 are exposed as in the state shown in FIG. 4. In the HUD unit 100 in the unused state (100(B)) shown in FIG. 6B, the back surface 20b of the combiner 20 is covered with a cover 30.

For example, the cover 30 is made of a material capable of suppressing reflection of visible light or is colored or coated with a certain material to suppress reflection of visible light. Therefore, when the HUD unit 100 is in the unused state (100(B)) shown in FIG. 6B, the cover 30 can prevent reflection of external light and thereby suppress influence of a ghost.

However, as long as the surface 20b of the combiner 20 is covered with the cover 30 (100(B)), ordinary HUD display cannot be performed. More specifically, even in the state that the combiner 20 is developed and an image that is displayed using light that is reflected by the front surface 20a can be projected toward the eye range ER, the driver can see only a virtual image of the displayed image. That is, since the cover obstructs the passage of light, the driver cannot see a scene ahead through the combiner 20.

Therefore, as in the HUD unit 100 in the used state (100(A)) shown in FIG. 6A, in the ordinary HUD display state the cover 30 needs to be removed from the combiner 20. To this end, for example, the drive mechanism as shown in FIG. 8 may be employed.

The configuration shown in FIG. 8 is provided with a combiner rotating drive unit M1 and a cover rotating drive unit M2 which can operate independently of each other. Connected to the combiner 20, the combiner rotating drive unit M1 drives the combiner 20 so that its inclination θ1 is varied in the range delimited by the values corresponding to the developed state (state 20(A)) and the accommodated state (state 20(B)) shown in FIG. 4.

Connected to the cover 30, the cover rotating drive unit M2 drives the cover 30 so that its inclination can be varied in a range that is wider than the inclination range of the combiner 20. The driving by the cover rotating drive unit M2 can be linked with that by the combiner rotating drive unit M1, whereby various forms shown in FIGS. 7A-7C can be realized.

More specifically, to displace the combiner 20 of the HUD unit 100 in the direction indicated by arrow A0 in the range delimited by the positions corresponding to the developed state and the accommodated state (see FIG. 7A; 100(B)), the combiner rotating drive unit M1 and the cover rotating drive unit M2 drive the combiner 20 and the cover 30, respectively, so that they are moved in the same manner and the back surface 20b of the combiner 20 is thereby kept in close contact with and covered with the cover 30.

To develop the combiner 20 of the HUD unit 100, after the combiner 20 has reached the development position having the above-mentioned restriction angle, the cover rotating drive unit M2 drives the cover 30 so that only the cover 30 is moved in the direction indicated by arrow A2 and thereby separated from the combiner 20 (see FIG. 7B; 100(C)). When a developed and escaped state has been established in which the cover 30 lies approximately horizontally, the driving by the cover rotating drive unit M2 is stopped (see FIG. 7C; 100(D)).

Therefore, when the combiner 20 of the HUD unit 100 is displaced in the direction indicated by arrow A0 in the range delimited by the positions corresponding to the accommodated state and the developed state (see FIG. 7A; 100(B)), influence of a ghost (described above) is suppressed by virtue of action of the cover 30 which is in close contact with the combiner 20. When a display on the HUD unit 100 is used, the cover 30 is completely separated from the surface of the combiner 20 and hence ordinary HUD display is enabled (see FIG. 7B; 100(C)). That is, the driver can see, at the same time, in superimposition, a virtual image that is projected by the HUD unit 100 and an image of a scene ahead that passes through the combiner 20.

<Countermeasure (2) Against Ghost in Unused State>

FIGS. 9A-9D show a modification of the form change of the display device for a vehicle shown in FIGS. 6A and 6B.

When the combiner 30 of the HUD unit 100 is displaced in the direction indicated by arrow A0 in the range delimited by the positions corresponding to the accommodated state and the developed state (see FIG. 9A; 100(B)), the back surface 20b of the combiner 20 is kept in close contact with and covered with the cover 30 as in the example shown in FIGS. 7A-7C.

To develop the combiner 20, after the combiner 20 has reached the development position having the restriction angle (mentioned above), only the cover 30 is moved (rotated) in the direction indicated by arrow A2 and is separated from the combiner 20 (see FIG. 9B; 100(C)).

Subsequently, the cover 30 is moved in the direction indicated by arrow A3, that is, in the length direction of the cover 30 which is perpendicular to its thickness direction, and is thereby pulled into the body of the HUD unit 100 (see FIG. 9C; 100(D)).

Therefore, when a display on the HUD unit 100 is used, the cover 30 is accommodated in the body of the HUD unit 100 and hence is not seen from the driver (see FIG. 9D; 100(E)).

In the case of the form change shown in FIGS. 9A-9D, the escaped cover 30 is accommodated inside without projecting forward as shown in FIG. 7C (100(D)). Therefore, it is not necessary to secure an extra installation space for installation of the HUD unit 100.

Figure 10A:
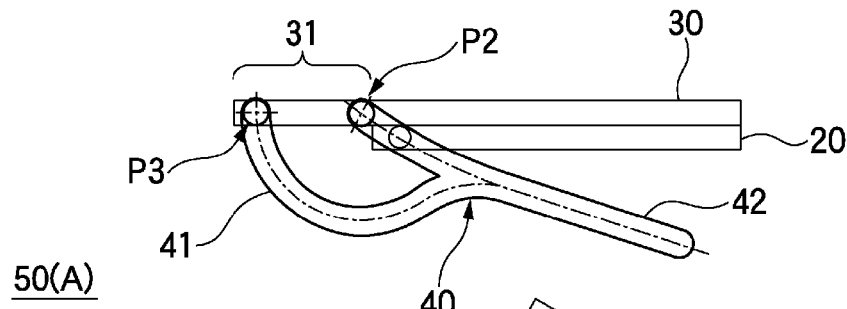
FIGS. 10A-10C are vertical sectional views showing plural states of a drive mechanism which enables the form change shown in FIGS. 9A-9D.
Figure 10B:
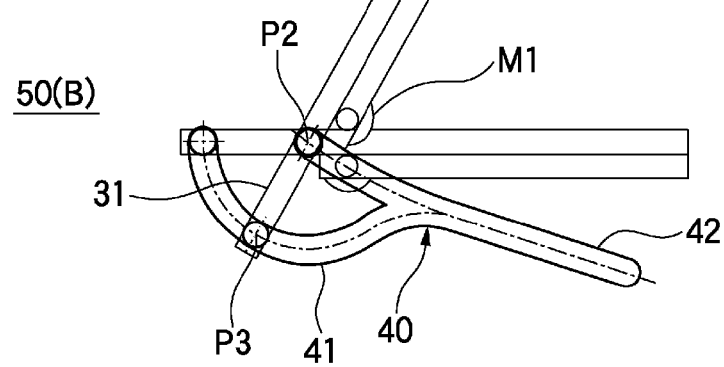
Figure 10C:
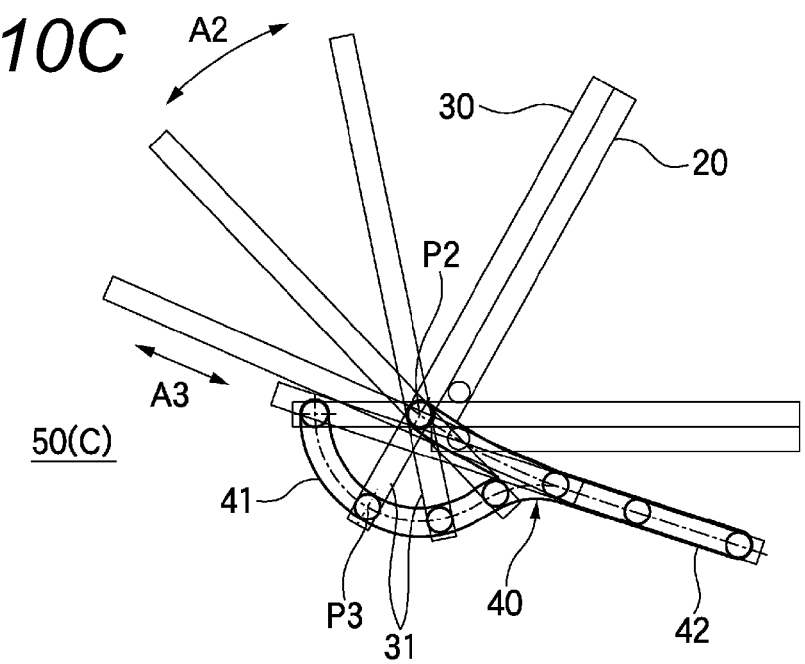
Figure 11:
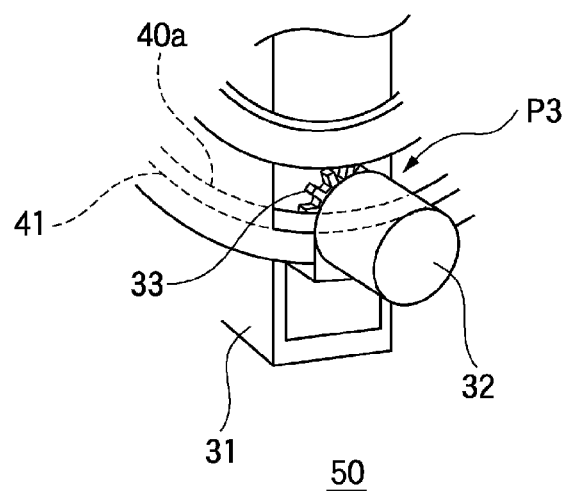
FIG. 11 is a perspective view showing the configuration of an essential part of the drive mechanism shown in FIGS. 10A-10C.

FIGS. 10A-10C show plural states of a drive mechanism which enables the form change shown in FIGS. 9A-9D. FIG. 11 shows the configuration of an essential part of the drive mechanism shown in FIGS. 10A-10C. That is, the drive mechanism shown in FIGS. 10A-10C and FIG. 11 is provided to enable the form change of the cover 30 shown in FIGS. 9A-9D.

In the drive mechanism 50, whereas the cover 30 is the same in length as the combiner 20, cover arms 31 extend from two respective rotation-axis-side side end portions of the cover 30 (see FIG. 10A; 50(A)). Guide grooves 40 for guiding the cover arms 31 are formed at such positions as to be opposed to the cover arms 31, respectively. Each guide groove 40 has an arc-shaped rotation groove 41 and a straight pull-in groove 42 which communicates with the rotation groove 41.

Each cover arm 31 is engaged with the associated guide groove 40 at a point P2 which is close to the end of the cover 30 and a point P3 which is close to the tip of the cover arm 31. As shown in FIG. 11, the drive mechanism 50 is equipped with electric motors 32 which are fixed to the respective cover arms 31 and a gear 33 is fixed to the drive shaft of each electric motor 32. The bottom surfaces of each rotation groove 41 and the pull-in groove 42 are formed with a gear 40a which can engage with the gear 33.

As a result, the displacement between the states 50(A), 50(B), and 50(C) shown in FIGS. 10A-10C can be realized. That is, when the drive mechanism 50 is in the state (accommodated state; 50(A)) shown in FIG. 10A, each cover arm 31 is engaged with the one end of the pull-in groove 42 and the one end of the rotation groove 41 at the respective points P2 and P3, whereby the cover 30 is accommodated so as to be laid on the combiner 20.

To rotate the combiner 20 from the accommodated state to the use state in which its inclination is to be set at the above-mentioned restriction angle, the above-described combiner rotating drive unit M1 is driven, whereby the cover 30 is displaced to the state shown in FIG. 10B (the drive mechanism 50 is brought into the state 50(B)) while being kept laid on the combiner 20. During this operation, the point P2 of each cover arm 31 makes almost no movement and the point P3 is moved along the arc-shaped rotation groove 41.

To separate the cover 30 from the combiner 20, the driving of the combiner rotating drive unit M1 is stopped and driving of the electric motors 32 of the drive mechanism 50 is started. As a result, each gear 33 is rotated and itself is moved along the associated rotation groove 41, whereby the cover arms 31 and the cover 30 which is connected to them are rotated. Therefore, the cover 30 is separated from the combiner 20 as shown in FIG. 10C (the drive mechanism 50 is brought into the state 50(C)).

As the electric motors 32 are driven further, the point P2 of each cover arm 31 reaches the pull-in groove 42 and the points P2 and P3 are thereafter moved straightly in the direction indicated by arrow A3, that is, along the pull-in groove 42. As a result, the cover 30 is pulled into the body of the HUD unit 100 and accommodated therein.

<Countermeasure (3) Against Ghost in Unused State>

Figure 12:
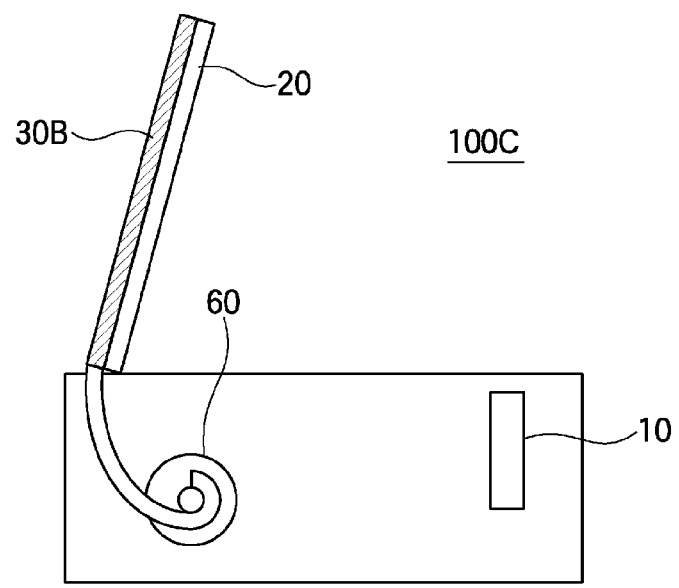
FIG. 12 is a vertical sectional view showing the configuration of a display device for a vehicle which is equipped with a wind-up mechanism.

FIG. 12 shows the configuration of a display device for a vehicle which is equipped with a wind-up mechanism.

In a HUD unit 100C shown in FIG. 12, a cover 30B which covers the back surface 20b of the combiner 20 has a windable structure and its bottom end is connected to a wind-up mechanism 60 which is provided in the body of the HUD unit 100C.

Therefore, when a display on the HUD unit 100C is used, the cover 30B can be wound up so as to be accommodated in the body and thereby separated from the combiner 20 by driving the wind-up mechanism 60. When a display on the HUD unit 100C is not used, a state shown in FIG. 12 in which the combiner 20 is covered with the cover 30B can be established by unwinding the cover 30B by driving the wind-up mechanism 60. Thus, influence of a ghost can be suppressed.

Figure 13:
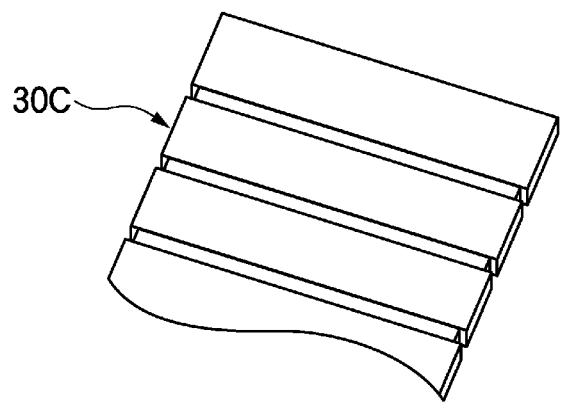
FIG. 13 is a perspective view showing a specific example of an appearance of a windable cover.
Figure 14:
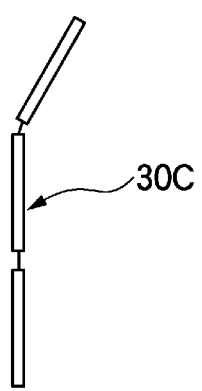
FIG. 14 is a side view showing a shape, in the thickness direction, of the windable cover shown in FIG. 13.
Figure 15:
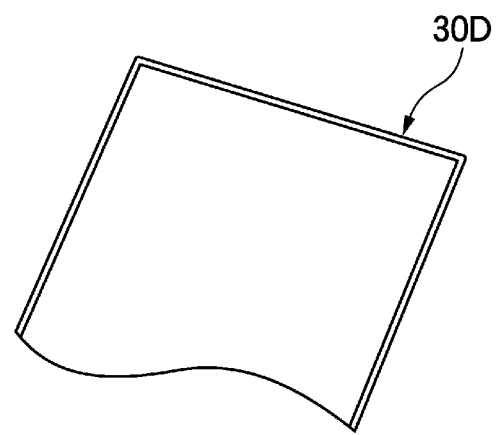
FIG. 15 is a perspective view showing a specific example of an appearance of another windable cover.
Figure 16:
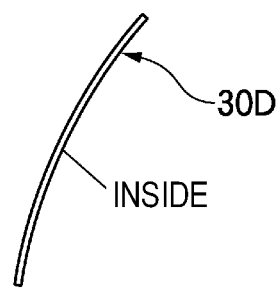
FIG. 16 is a side view showing a shape, in the thickness direction, of the windable cover shown in FIG. 15.

FIGS. 13 and 14 show a cover 30C which can be wound up like the cover 30B shown in FIG. 12. FIG. 14 shows a shape, in the thickness direction, of the cover 30C shown in FIG. 13. FIGS. 15 and 16 show another windable cover 30D. FIG. 16 shows a shape, in the thickness direction, of the cover 30D shown in FIG. 15.

In the cover 30C shown in FIGS. 13 and 14, plural plate-like materials are arranged in the length direction of the cover 30C and adjoining plate-like materials are connected to each other by a flexible material. Therefore, even if each plate-like material is not bendable, the cover 30C can be warped at the positions where the plate-like materials are connected to each other. Therefore, the cover 30C can be wound up using the wind-up mechanism 60 shown in FIG. 12.

The cover 30D shown in FIGS. 15 and 16 is made of a flexible, thin-plate-like (or sheet-like) material as a whole. Therefore, the cover 30D can be wound up using the wind-up mechanism 60 shown in FIG. 12.

As for the characteristics of the material of the cover 30D shown in FIG. 15, it is desirable that it be elastic and produce force of bending itself so that it becomes convex toward the outside (i.e., the side away from the surface of the combiner 20) even in a steady state (see FIG. 16). By virtue of this elastic force, the whole of the cover 30D can be brought into contact with the surface of the combiner 20 naturally.

Figure 17:
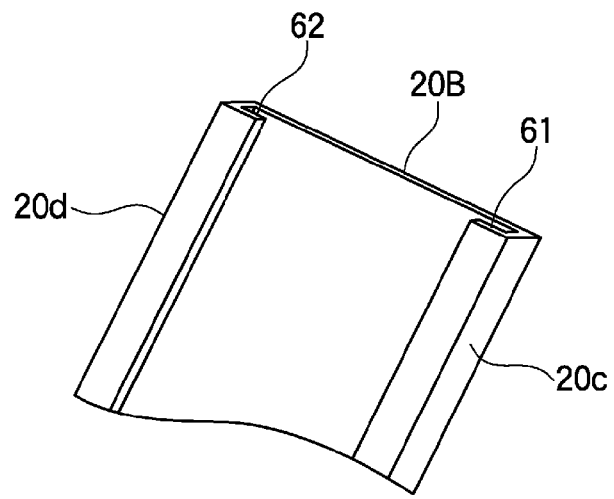
FIG. 17 is a perspective view showing a specific example of an appearance of a combiner.

FIG. 17 shows a specific example of an appearance of the combiner 20 of the HUD unit 100C shown in FIG. 12. In the combiner 20B shown in FIG. 17, two side end portions 20c and 20d are bent to the back side (i.e., the side where the combiner 20B is opposed to the cover 30) so as to form respective guide grooves 61 and 62.

That is, when the cover 30C shown in FIG. 13 or the cover 30D shown in FIG. 15 is moved alongside the combiner 20, the two side end portions of the cover can be guided by the respective guide grooves 61 and 62. As a result, the surface of the cover 30C or 30D can be prevented from lifting up from the combiner 20 in developing or housing it. This contributes to reduction of influence of a ghost.

<Other Modifications>

Figure 18:
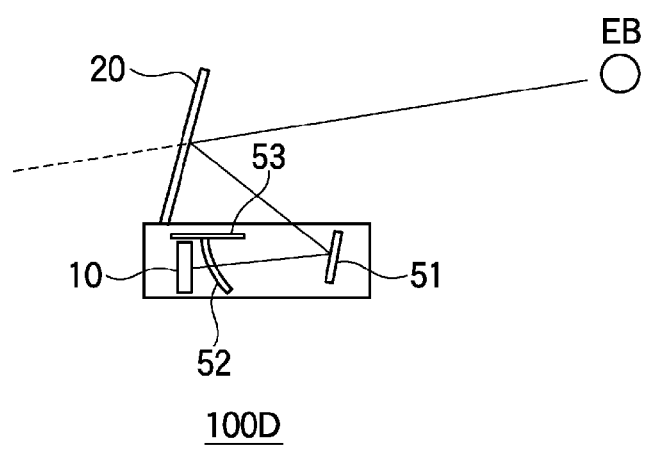
FIG. 18 is a vertical sectional view showing the configuration of a display device for a vehicle according to a modification.

FIG. 18 shows the configuration of a display device for a vehicle according to a modification. In a HUD unit 100D shown in FIG. 18, an optical path bending mirror 51 is disposed on the optical path between the above-mentioned display device 10 and the combiner 20. That is, an optical image emitted from the display device 10 is reflected by the optical path bending mirror 51 and resulting reflection light is reflected by the surface of the combiner 20 and projected toward the eye box EB.

Even if the body of the HUD unit 100D is small, the employment of the optical path bending mirror 51 makes it possible to secure a sufficiently long optical path length and thereby reduce the magnification of the optical system that is necessary for elongating the distance between a virtual image displayed and the eye box EB.

In the HUD unit 100D shown in FIG. 18, a thin-plate-like shield wall 53 made of a light shield material is disposed above the display device 10 so as to prevent direct incidence of external light such as sunlight on the display surface of the display device 10. This makes it possible to prevent reduction of the display contrast due to influence of external light.

In the HUD unit 100D shown in FIG. 18, a transparent cover 52 is disposed on the exit side of the display surface of the display device 10. The transparent cover 52 covers the display surface of the display device 10 so as to prevent dirt, dust, or the like coming from outside the device from entering the side of the display device 10.

The transparent cover 52 has a curved surface. This makes it possible to prevent a phenomenon that external light is reflected by the surface of the transparent cover 52 and resulting superfluous reflection light influences an image displayed on the HUD unit 100D.

The transparent cover 52 and the shield wall 53 shown in FIG. 18 can likewise be applied to the HUD unit 100 that is not equipped with the optical path bending mirror 51.

When a HUD display on the HUD unit 100 is used, as described above it is necessary to separate the cover 30 from the combiner 20. However, in a situation that the driver need not see a scene ahead carried by light that passes through the combiner 20, ordinary display may be made with the back surface of the combiner 20 covered with the cover 30. That is, the device may be configured so that when display is being made whether the combiner 20 should be covered with the cover 30 can be switched using a switch or the like. Where ordinary display is made with the back surface of the combiner 20 covered with the cover 30, the display is made against a dark background. As a result, the luminance of the display device 10 can be lowered, which leads to reduction in power consumption. Furthermore, the contrast of the display becomes stable.

The features of the above-described HUD unit according to the embodiment of the invention will be summarized below in a simplified manner as items i to ix.

[i] A HUD unit (100) which has a display device (10) for displaying visible information and which reflects with a combiner (20) and projects, toward a prescribed observation region, light carrying visible information to be displayed on the display device (10) to display the visible information in a form of a virtual image, comprising:

a deploying and accommodating mechanism configured to change a state of disposition of the combiner (20) between a position of a use state in which a display can be seen in the observation region and a position of an unused state in which a display cannot be seen in the observation region, wherein the deploying and accommodating mechanism includes a restricting unit configured to restrict an inclination, with respect to a prescribed direction, of a surface of the combiner (20) to a predetermined angle of a ghost suppression state at least when the combiner (20) is located at the position of the use state.

[ii] The HUD unit (100) according to item [i], wherein the deploying and accommodating mechanism includes a slide mechanism (101) which can move the combiner parallel with the surface of the combiner in a vertical direction while the inclination of the surface of the combiner (20) is kept at the angle of the ghost suppression state.

[iii] The HUD unit (100) according to item [i], wherein the deploying and accommodating mechanism includes a rotation shaft (21) configured to adjust the inclination of the surface of the combiner (20) between the angle of the ghost suppression state and an angle of an escape state in which the surface of the combiner (20) is approximately located in a horizontal direction.

[iv] The HUD unit (100) according to item [iii], further comprising:
  a light reflection suppressing cover (30) capable of covering a surface, opposite to a projection surface, of the combiner (20); and
  a cover rotating drive mechanism (M2) capable of causing the light reflection suppressing cover (30) to escape to a position that is distant from the combiner (20) at least when the combiner (20) is located in the angle of the ghost suppression state.

[v] The HUD unit (100) according to item [iv], wherein the deploying and accommodating mechanism includes a combiner rotating drive unit (M1) configured to adjust the inclination of the surface of the combiner (20) and the cover rotating drive mechanism (M2) configured to adjust at least the inclination of the light reflection suppressing cover (30).

[vi] The HUD unit (100) according to item [v], wherein the cover rotating drive mechanism (M2) includes, as guide grooves for restricting movement of the light reflection suppressing cover (30), a rotation groove (41) which is engaged with a first portion of the light reflection suppressing cover (30) and guides the light reflection suppressing cover (30) in its rotation direction and a pull-in groove (42) which communicates with the rotation groove, is engaged with a second portion of the light reflection suppressing cover (30), and guides the light reflection suppressing cover (30) in a direction that is parallel with its surface.

[vii] The HUD unit (100) according to item [iv],
  wherein the deploying and accommodating mechanism includes the combiner rotating drive unit (M1) configured to adjust the inclination of the surface of the combiner (20) and the cover rotating drive mechanism (M2) configured to adjust the position of the light reflection suppressing cover (30) between a position for covering the combiner (20) and a position of escape from the combiner (20);
  wherein the light reflection suppressing cover (30) is deformable; and
  wherein the cover rotating drive mechanism (M2) has a wind-up mechanism (60) which is connected to a bottom end of the light reflection suppressing cover (30).

[viii] The HUD unit (100) according to item [vii], wherein side end portions of the combiner (20) are formed with guide grooves for restricting a movement range of the light reflection suppressing cover (30) so that the light reflection suppressing cover (30) can move only parallel with the surface of the combiner (20).

[iv] The HUD unit (100) according to any one of items [i] to [viii], further comprising an optical path bending mirror (51) which is disposed on an optical path between the display device (10) and the combiner (20).

Although the invention has been described in detail by referring to the particular embodiment, it is apparent to those skilled in the art that various changes and modifications are possible without departing from the spirit and scope of the invention.

The display device for a vehicle according to the invention is useful in the field of head-up displays which display visible information as a virtual image.

What is claimed is:

1. A display device for a vehicle which has a display unit for displaying visible information and which reflects with a combiner and projects, toward a prescribed observation region, light carrying visible information to be displayed on the display unit to display the visible information in a form of a virtual image, the display device comprising:
  a deploying and accommodating mechanism configured to change a state of disposition of the combiner between a position of a use state in which a display can be seen in the observation region and a position of an unused state in which a display cannot be seen in the observation region;
  a light reflection suppressing cover capable of covering a surface, opposite to a projection surface, of the combiner; and
  a cover escape mechanism connected to the light reflection suppressing cover and moves the light reflection suppressing cover between cover position where the light reflection suppressing cover contacts and completely covers the opposite surface of the combiner, and an escape position where the light reflection suppressing cover is distant from the combiner at least when the combiner is located in the angle of the ghost suppression state,
  wherein the deploying and accommodating mechanism is configured to rotate the combiner about a rotational shaft;
  wherein the deploying and accommodating mechanism includes a restricting unit configured to restrict a rotation angle of the rotation shaft so as to set an inclination, with respect to a prescribed direction, of a surface of the combiner to a predetermined angle of a ghost suppression state at least when the combiner is located at the position of the use state, the ghost suppression state preventing formation of a visible ghost image and being accomplished solely by restricting the rotation angle of the rotation shaft by the restricting unit so as to set the predetermined angle of inclination of the surface of the combiner.

2. The display device for the vehicle according to claim 1, wherein the deploying and accommodating mechanism includes a slide mechanism which can move the combiner parallel with the surface of the combiner in a vertical direction while the inclination of the surface of the combiner is kept at the angle of the ghost suppression state.

3. The display device for the vehicle according to claim 1, wherein the deploying and accommodating mechanism includes an angle adjusting mechanism configured to adjust the inclination of the surface of the combiner between the angle of the ghost suppression state and an angle of an escape state in which the surface of the combiner is approximately located in a horizontal direction.

4. The display device for the vehicle according to claim 1, wherein the deploying and accommodating mechanism includes a first drive unit configured to adjust the inclination of the surface of the combiner and a second drive unit configured to adjust at least the inclination of the light reflection suppressing cover.

5. The display device for the vehicle according to claim 4, wherein the second drive unit includes, as guide grooves for restricting movement of the light reflection suppressing cover, a rotation groove which is engaged with a first portion of the light reflection suppressing cover and guides the light reflection suppressing cover in its rotation direction and a pull-in groove which communicates with the rotation groove, is engaged with a second portion of the light reflection suppressing cover, and guides the light reflection suppressing cover in a direction that is parallel with its surface.

6. The display device for the vehicle according to claim 1, wherein the deploying and accommodating mechanism includes a first drive unit configured to adjust the inclination of the surface of the combiner and a second drive unit configured to adjust the position of the light reflection suppressing cover between a position for covering the combiner and a position of escape from the combiner;
   wherein the light reflection suppressing cover is deformable; and
   wherein the second drive unit has a wind-up mechanism which is connected to a bottom end of the light reflection suppressing cover.

7. The display device for the vehicle according to claim 6, wherein side end portions of the combiner are formed with guide grooves for restricting a movement range of the light reflection suppressing cover so that the light reflection suppressing cover can move only parallel with the surface of the combiner.

8. The display device for the vehicle according to claim 1, further comprising:
   an optical path bending mirror which is disposed on an optical path between the display unit and the combiner.

9. The display device for the vehicle according to claim 1, wherein the display device displays visible information using a single combiner.

10. The display device for the vehicle according to claim 9, wherein the single combiner is unitarily formed.

11. The display device for the vehicle according to claim 1, wherein the display unit projects image information directly to the combiner, which then performs reflection.

12. The display device for the vehicle according to claim 11, wherein the display unit is oriented to oppose the combiner when the combiner is located at the position of the use state.

13. The display device for the vehicle according to claim 1, wherein a virtual image ghost is projected toward the prescribed observation region; and
   wherein the virtual image ghost is formed by reflecting an optical image on the combiner with a predetermined surface of a windshield, the optical image on the combiner being formed by a reflection light coming from a back surface of the combiner.

* * * * *